April 21, 1925.
A. O. HURXTHAL
1,534,853
LOOP DRIER
Filed Nov. 10, 1924
2 Sheets-Sheet 1
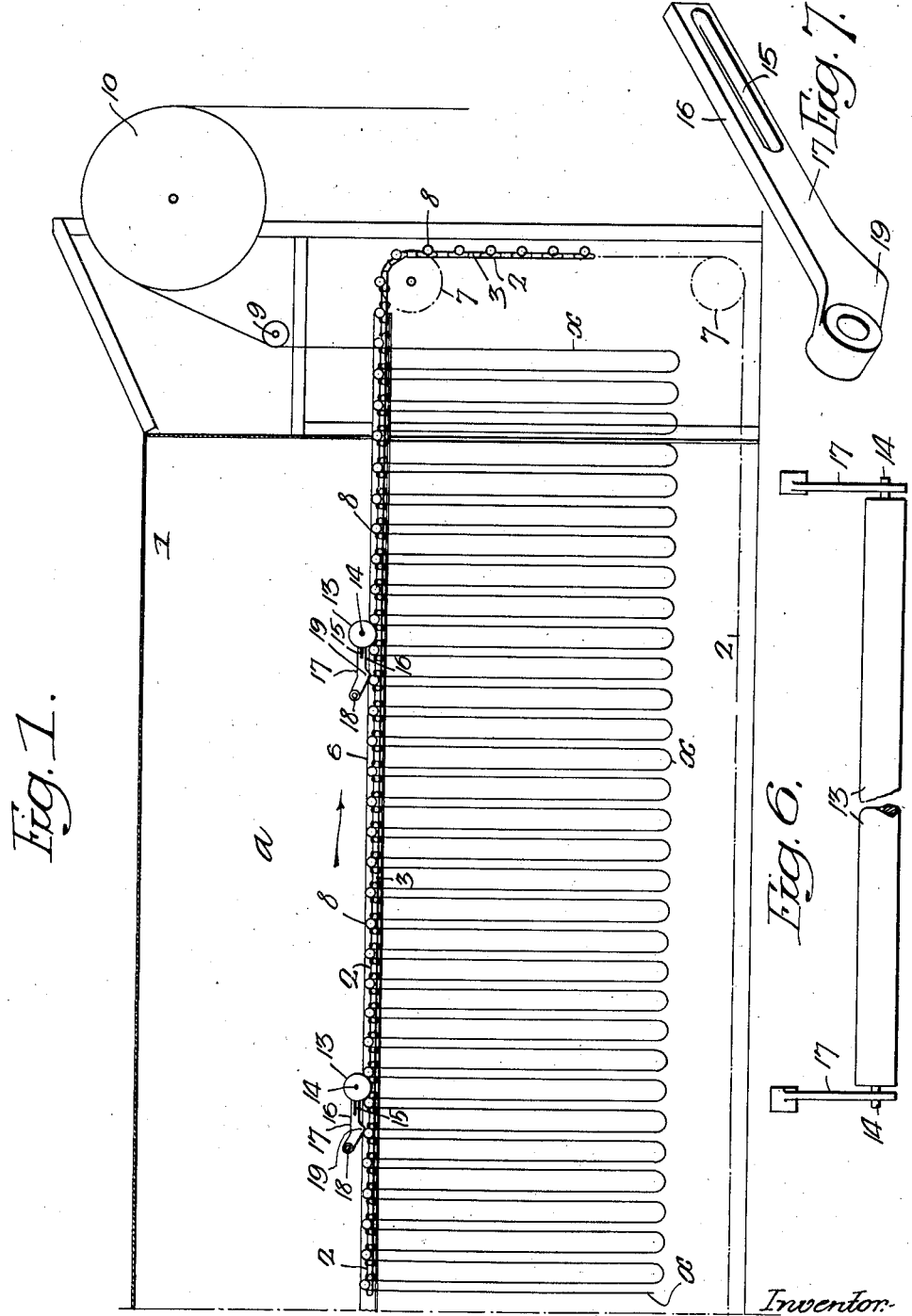

April 21, 1925.
A. O. HURXTHAL
LOOP DRIER
Filed Nov. 10, 1924
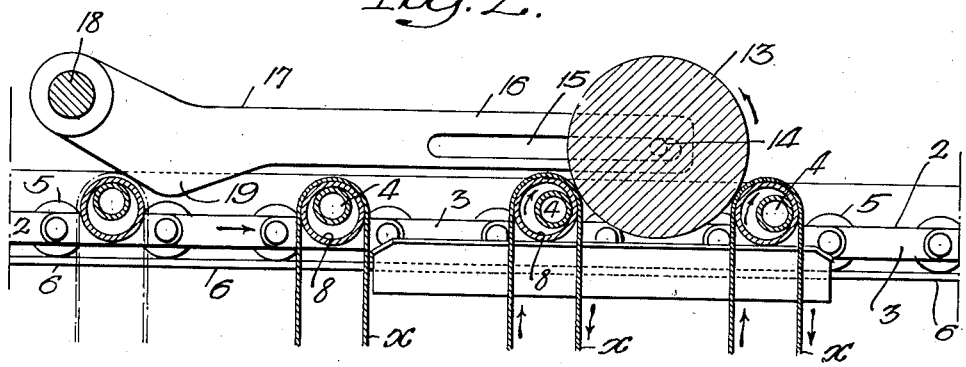
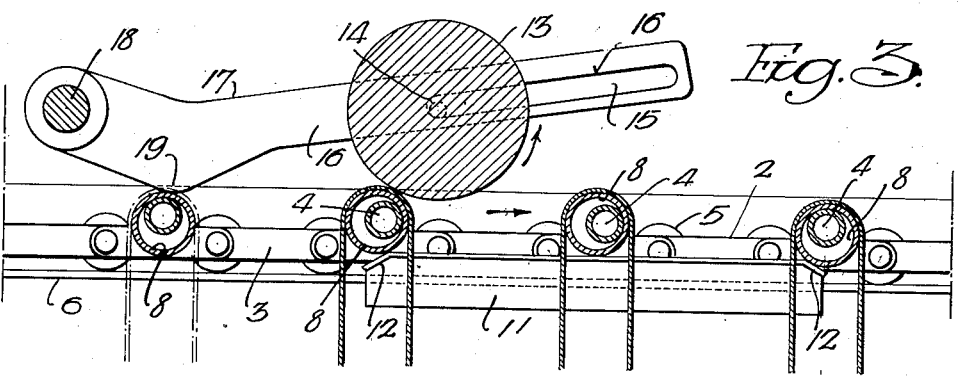
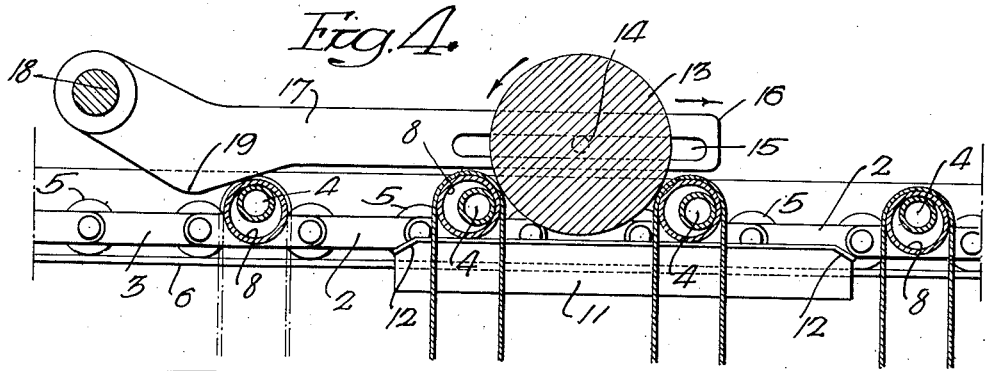
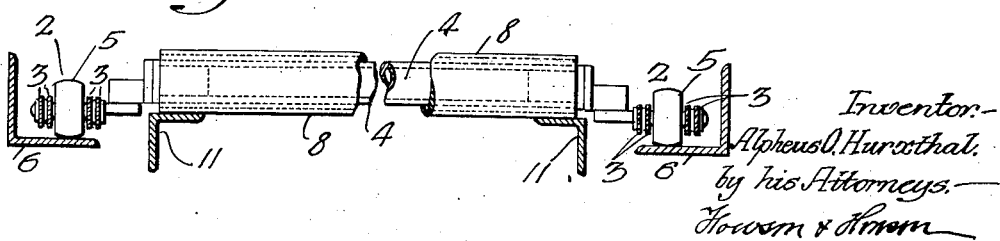

Patented Apr. 21, 1925.

1,534,853

UNITED STATES PATENT OFFICE.

ALPHEUS O. HURXTHAL, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

LOOP DRIER.

Application filed November 10, 1924. Serial No. 749,095.

*To all whom it may concern:*

Be it known that I, ALPHEUS O. HURXTHAL, a citizen of the United States, residing in Philadelphia, Pennsylvania, have invented certain Improvements in Loop Driers, of which the following is a specification.

My invention relates to certain improvements in driers of the type in which the material to be dried is suspended in loops from girts, which travel through a drying chamber in which heated air is circulated.

The object of the invention is to provide means for shifting the cloth, or other material, suspended from the girts so that it will not be marked by the girts. When used in connection with a shrinking machine, the shrinkage is uniform throughout the entire length of the cloth.

This object I attain by turning the material positively with the girts as it passes through the drier.

In the accompanying drawings:

Fig. 1 is a longitudinal sectional view of one end of a loop drier illustrating my invention;

Fig. 2 is an enlarged sectional view, showing a roller located between two girts and engaging the material being dried;

Fig. 3 is a view, similar to Fig. 2, showing the roller raised;

Fig. 4 is a view showing the roller located between another pair of girts and traveling with the material;

Fig. 5 is a transverse sectional view, showing a girt and its carrier;

Fig. 6 is a plan view of one of the rollers; and

Fig. 7 is a detached perspective view of one of the levers.

Referring to the drawings, 1 is the casing of a drier, which encloses a drying chamber *a*, in which heated air is circulated in the ordinary manner. An endless carrier 2 travels throughout the length of the drier and consists of chains 3 and connecting bars 4, which are tubular in form, as shown in the drawings. Mounted on the chains are rollers 5, which travel on tracks 6 in the form of angle irons. The chains pass around sprocket wheels 7 that are shown by dotted lines in Fig. 1. The carrier is driven in any suitable manner. Mounted on each transverse bar are tubular girts 8, which are larger than the bars to allow the girts freedom of movement.

The material *x* to be dried is formed in loops, as shown in Fig. 1, the loops being suspended from the girts 8. As the material is carried through the drier by the endless carrier, the heated air in circulation dries it. The material is removed from the girts at the discharge end of the drier (as shown in Fig. 1) and is passed over a guide roller 9 and a drum 10.

To prevent marking of the material at the points where it rests upon the girts, means are provided for turning the girts and the material at two or more places throughout the length of the drying chamber.

In cloth shrinking machines, the position of the material is changed so that the fabric will shrink evenly.

At certain points throughout the length of the drying chamber, rails 11 are provided, which are in the path of the girts, and are so located that the girts are raised off of the cross bars 4 and travel over the rails, which are beveled at each end, as indicated at 12.

Located above the rails is a roller 13, which is shorter than the girts. This roller has trunnions 14 that extend into slots 15 in arms 16 of the levers 17. The cross bars 18 are located in a fixed position in the casing 1 of the drier. The levers are pivotally mounted on these cross bars. Each lever has a cam projection 19 in the path of the girts. As one of the girts passes under the cam, the lever is raised to elevate the roller and to allow the girt preceding it to pass under the roller, as in Fig. 3. After the girt passes under the roller, the roller drops between the two girts, as indicated in Fig. 4, and the material is held between a girt and the roller. As the girts turn, they turn the material and the roller, which causes the material to assume another position on the girts.

The rollers are free to travel forward wth the girts, as the trunnions of the roller travel in the slots 15 of the levers 17. When the roller is moved to the position shown in Fig. 2, another girt comes in contact with the cam surface 19 of the levers and raises the levers and the roller clear of the girts, the roller returning to the position shown in Fig. 3, ready to enter the space between another pair of girts.

By the construction hereinbefore described, the cloth, or other material, is moved positively with the girts, which do not slip under the cloth. This construction insures perfect drying of the material and uniform shrinkage, when the apparatus is used in a cloth shrinking machine.

I claim:

1. The combination in an apparatus for drying, or shrinking, cloth, of a casing; a carrier having a series of girts upon which the cloth is looped; a roller arranged to enter the space between two girts and to hold the cloth to the girts; means for turning the girts; and means for raising and lowering the roller.

2. The combination of a casing; an endless carrier; rails upon which the carrier travels, each carrier consisting of side chains and transverse bars; girts mounted on the bars, said girts being of a greater diameter than the bars; short rails which raise the girts so that they turn freely, independently of the bars; levers actuated by a succeeding girt; and a roller mounted on the levers and arranged to be raised by the succeeding girt and to be lowered between a pair of girts so as to hold the cloth against the girts in order that it may turn with the girts.

3. The combination of a casing; rails at each side thereof; a carrier consisting of two chains spaced apart; bars connecting the chains, said chains traveling on rails; girts loosely mounted on the bars, said girts being of a greater diameter than the bars; short elevated rails in the path of the girts so that the girts are raised clear of the bars and are turned as they travel on the short rails; pivoted levers having slotted arms; a roller having trunnions mounted in the slots of the arms, said roller being located so as to drop between two girts and to hold the material to the girts; and a cam on each lever in the path of the girts as they travel towards the elevated rails, the slots in the bars allowing the roller to travel with the carrier a given distance to insure the turning of the material with the girts.

ALPHEUS O. HURXTHAL.